(12) United States Patent
Song et al.

(10) Patent No.: US 11,323,170 B2
(45) Date of Patent: May 3, 2022

(54) BEAM TRAINING METHOD AND DEVICE

(71) Applicant: China Academy of Telecommunications Technology, Beijing (CN)

(72) Inventors: Yang Song, Beijing (CN); Qiubin Gao, Beijing (CN); Runhua Chen, Beijing (CN); Tamrakar Rakesh, Beijing (CN); Xin Su, Beijing (CN); Chuanjun Li, Beijing (CN); Mengjun Wang, Beijing (CN); Yu Yang, Beijing (CN); Hui Li, Beijing (CN); Qiuping Huang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 303 days.

(21) Appl. No.: 16/324,902

(22) PCT Filed: Jun. 7, 2017

(86) PCT No.: PCT/CN2017/087487
§ 371 (c)(1),
(2) Date: Feb. 11, 2019

(87) PCT Pub. No.: WO2018/028290
PCT Pub. Date: Feb. 15, 2018

(65) Prior Publication Data
US 2021/0083754 A1      Mar. 18, 2021

(30) Foreign Application Priority Data
Aug. 12, 2016   (CN) .......................... 201610666020.1

(51) Int. Cl.
*H04B 7/08*       (2006.01)
*H04B 7/0417*     (2017.01)
*H04B 7/06*       (2006.01)

(52) U.S. Cl.
CPC ......... *H04B 7/0851* (2013.01); *H04B 7/0417* (2013.01); *H04B 7/063* (2013.01)

(58) Field of Classification Search
CPC .................................................. H04B 7/0851
See application file for complete search history.

(56) References Cited

U.S. PATENT DOCUMENTS

2011/0211490 A1*  9/2011  Nikula ................... H04B 7/086
                                                    370/252
2012/0122392 A1   5/2012  Morioka et al.
(Continued)

FOREIGN PATENT DOCUMENTS

CN       104734759 A      6/2015
CN       105308881 A      2/2016
(Continued)

OTHER PUBLICATIONS

U.S. Appl. No. 62/314,341, filed Mar. 2016, Kim; Beomsup.*

*Primary Examiner* — Hsinchun Liao
(74) *Attorney, Agent, or Firm* — Kilpatrick Townsend & Stockton, LLP

(57) ABSTRACT

The present invention relates to the technical field of wireless communications, and in particular, to a beam training method and device, for use in resolving the problems in the prior art of excessive time-consuming of a beam training process, large overhead of training signals, and relatively low efficiency. According to embodiments of the present invention, a transmit device sends beam training signals in two times. The first sending of a transmit beam training signal is for a receive device to select a transmit beam using a selected receive beam and report the transmit beam. The (Continued)

second sending is that the transmit device sends a receive beam training signal according to the transmit beam information report of the receive device, so as to train the received beam of the receive device. According to the embodiments of the present invention, an interactive beam training method is used to gradually search for the best transmit beam and receive beam, thereby avoiding completing beam training all at once, reducing beam training time and overhead, and improving efficiency.

17 Claims, 3 Drawing Sheets

(56) References Cited

U.S. PATENT DOCUMENTS

| | | |
|---|---|---|
| 2013/0065622 A1* | 3/2013 | Hwang ................ H04W 16/28 455/500 |
| 2013/0102345 A1 | 4/2013 | Jung |
| 2013/0121185 A1 | 5/2013 | Li et al. |
| 2015/0244432 A1 | 8/2015 | Wang |
| 2015/0341095 A1 | 11/2015 | Yu et al. |
| 2015/0341105 A1 | 11/2015 | Yu et al. |
| 2016/0043781 A1 | 2/2016 | Cho et al. |
| 2016/0142922 A1 | 5/2016 | Chen et al. |

FOREIGN PATENT DOCUMENTS

| | | |
|---|---|---|
| EP | 2988431 A1 | 2/2016 |
| JP | 2016504000 A | 2/2016 |
| WO | 2015125891 A1 | 8/2015 |
| WO | 2015176684 A1 | 11/2015 |
| WO | 2015190648 | 12/2015 |

* cited by examiner

BEAM TRAINING METHOD AND DEVICE

This application is a National Stage of International Application No. PCT/CN2017/087487, filed Jun. 7, 2017, which claims priority to Chinese Patent Application No. 201610666020.1, filed with the Chinese Patent Office on Aug. 12, 2016, and entitled "Beam training method and device", which is hereby incorporated by reference in its entirety.

FIELD

The present invention relates to the field of wireless communications, and particularly to a beam training method and device.

BACKGROUND

At present, in order to further improve the Multi-Input Multi-Output (MIMO) technology, the massive antenna technology has been introduced to a mobile communication system. A massive antenna array in a base station can include 512 or even 1024 antenna elements. Each antenna element in an array of all-digit antennas is connected with a Transmitting and Receiving Unit (TXRU), and in this manner, there may be 512 or even 1024 TXRUs. A user equipment can also be configured with an array of antennas including 32 or 64 antenna elements. Beam-forming can be applied to both the base station and the user equipment for a significant beam-forming gain to thereby make up for signal attenuation arising from a path loss. Particularly there is such a more serious path loss in a high frequency band (e.g., above the frequency 30 GHz) than that in a low frequency band that there is an extremely limited coverage area of a radio signal. With the beam-forming technology for the massive antenna array, the coverage area of a radio signal can be extended to a practicable coverage area.

In order to further improve the performance of analog beam-forming, there is also a transmission and reception solution with hybrid digital and analog beam-forming, and in this solution, there is a tradeoff between the flexibility of digital beam-forming, and the low complexity of analog beam-forming, so concurrent beam-forming of a plurality of data flows and a plurality of user equipments can be supported, and also the complexity can also be controlled in a reasonable range.

Both the existing analog beam-forming and the existing hybrid digital and analog beam-forming shall be performed by adjusting analog beam-forming weights of a transmitter and a receiver so that their resulting beams can be oriented to each other in communication. For downlink transmission, beam-forming weights of the transmitting base station side, and beam-forming weights of the receiving user equipment shall be adjusted; and for uplink transmission, beam-forming weights of the transmitting user equipment, and beam-forming weights of the receiving base station side shall be adjusted. Beam-forming weights are typically obtained by transmitting training signals.

Typically all the transmission beams are traversed and transmitted in the existing analog beam training process so that the receiver searches for the optimum transmission beam, and each transmission beam is transmitted repeatedly so that the receiver adjusts its reception beam, and searches for the optimum reception beam. Accordingly it is very time-consuming to search for the optimum transmission and reception beams, and there is a significant overhead of training signals, in the beam training process.

In summary, the existing beam training process is very time-consuming, has a significant overhead of training signals, and is rather inefficient.

SUMMARY

Embodiments of the invention provide a beam training method and device so as to address the problem in the prior art that the existing beam training process is very time-consuming, has a significant overhead of training signals, and is rather inefficient.

In a first aspect, an embodiment of the invention provides a beam training method including:

determining, by a transmitting device, transmission beams corresponding to transmission beam training signals;

transmitting, by the transmitting device, the transmission beam training signals to a receiving device using the transmission beams corresponding to the transmission beam training signals;

determining, by the transmitting device, at least one transmission beam corresponding to reception beam training signals; and transmitting, by the transmitting device, the reception beam training signals to the receiving device using the at least one transmission beam corresponding to the reception beam training signals.

Optionally determining, by the transmitting device, the at least one transmission beam corresponding to the reception beam training signals includes: determining, by the transmitting device, the at least one transmission beam corresponding to the reception beam training signals according to a received transmission beam information report fed back by the receiving device.

Optionally after the transmitting device determines the at least one transmission beam corresponding to the reception beam training signals, the method further includes: transmitting, by the transmitting device, data to the receiving device using the at least one transmission beam determined according to the transmission beam information report fed back by the receiving device before a transmission beam information report to be fed back by the receiving device next time is received.

Optionally the transmission beams corresponding to the transmission beam training signals includes: a part or all of transmission beams, wherein the part of transmission beams are transmission beams in at least one direction selected from all transmission beams; and/or transmission beams in adjacent directions of the at least one transmission beam determined by the transmitting device according to a received transmission beam information report fed back by the receiving device, wherein the at least one transmission beam corresponding to the transmission beam information report is at least one transmission beam selected by the receiving device according to the received transmission beam training signals.

Optionally before the transmitting device transmits the transmission beam training signals to the receiving device using the transmission beams corresponding to the transmission beam training signals, the method further includes: transmitting, by the transmitting device, first transmission beam information of the transmission beams corresponding to the transmission beam training signals to the receiving device, so that the receiving device receives the beam training signals corresponding to the transmission beams according to the first transmission beam information.

Optionally the first transmission beam information includes a part or all of: the number of transmission beam training signals, a sequence of each of the transmission beam training signals, a resource occupied by each of the transmission beam training signals, a periodicity of each of the transmission beam training signals, triggering information of each of the transmission beam training signals, start information of each of the reception beam training signals, end information of each of the reception beam training signals, and a transmitting device identification number corresponding to each of the transmission beam training signals.

Optionally before the transmitting device transmits the reception beam training signals to the receiving device using the at least one transmission beam corresponding to the reception beam training signals, the method further includes: transmitting, by the transmitting device, second transmission beam information of the at least one transmission beam corresponding to the reception beam training signals to the receiving device, so that the receiving device receives the determined reception beam training signals corresponding to the at least one transmission beam according to the second transmission beam information.

Optionally the second transmission beam information includes a part or all of: the number of reception beam training signals, a sequence of each of the reception beam training signals, a resource occupied by each of the reception beam training signals, a periodicity of each of the reception beam training signals, triggering information of each of the reception beam training signals, start information of each of the reception beam training signals, end information of each of the reception beam training signals, and a transmitting device identification number corresponding to each of the reception beam training signals.

Optionally the transmitting device places the first transmission beam information and the second transmission beam information in different signaling, and transmits the signaling to the receiving device; or the transmitting device places the first transmission beam information and the second transmission beam information in the same signaling, and transmits the signaling to the receiving device.

Optionally transmitting, by the transmitting device, the reception beam training signals to the receiving device using the at least one transmission beam corresponding to the reception beam training signals includes: when the receiving device receives a reception beam training signal corresponding to one transmission beam using one reception beam, then transmitting, by the transmitting device, the reception beam training signal repeatedly.

Optionally the method further includes: when the transmission beam information report received by the transmitting device includes a transmitting device identification number, then determining, by the transmitting device, a transmitting device providing the transmission beam corresponding to the received transmission beam information report according to the transmitting device identification number; and when the transmission beam information received by the transmitting device does not include any transmitting device identification number, but includes a transmission beam training signal index, then determining, by the transmitting device, a transmitting device, which provides the transmission beam corresponding to the received transmission beam information report, according to a correspondence relationship between the transmission beam training signal index in the transmission beam information report, and the transmitting device providing the transmission beam.

Optionally the transmitting device performs periodically or aperiodically the step of transmitting the transmission beam training signals to the receiving device using the transmission beams corresponding to the transmission beam training signals; and/or the transmitting device performs periodically or aperiodically the step of transmitting the reception beam training signals to the receiving device using the at least one transmission beam corresponding to the reception beam training signals.

In a second aspect, an embodiment of the invention provides a beam training method including: receiving, by a receiving device, transmission beam training signals corresponding to transmission beams from a transmitting device using at least one reception beam; selecting, by the receiving device, at least one of the transmission beams corresponding to the transmission beam training signals, and feedings a transmission beam information report determined according to the selected at least one transmission beam back to the transmitting device; receiving, by the receiving device, reception beam training signals transmitted by the transmitting device using at least one reception beam; and determining, by the receiving device, at least one reception beam as a selected reception beam according to the reception beam training signals received.

Optionally after the receiving device determines the at least one reception beam as the selected reception beam, the method further includes: receiving, by the receiving device, data from the transmitting device using the selected reception beam before reception beam training signals are received next time.

Optionally the transmission beam information report includes a resource index of the beam training signal determined according to the selected transmission beam.

Optionally before the receiving device receives the transmission beam training signals corresponding to the transmission beams from the transmitting device using the at least one reception beam, the method further includes: determining, by the receiving device, first transmission beam information; and receiving, by the receiving device, the transmission beam training signals corresponding to the transmission beams from the transmitting device using the at least one reception beam includes: receiving, by the receiving device, the transmission beam training signals corresponding to the transmission beams from the transmitting device using the at least one reception beam according to the first transmission beam information.

Optionally determining, by the receiving device, the first transmission beam information includes:
receiving, by the receiving device, the first transmission beam information from the transmitting device.

Optionally selecting, by the receiving device, at least one of the transmission beams corresponding to the transmission beam training signals includes: selecting, by the receiving device, at least one transmission beam or transmission beam training signal index from the transmission beams corresponding to the beam training signals according to performance index parameters of the received transmission beam training signals; and/or determining, by the receiving device, at least one of the reception beams as the selected reception beam according to the reception beam training signals received using the different reception beams includes: determining, by the receiving device, at least one reception beam as the selected reception beam according to performance index parameters of the reception beam training signals received.

Optionally the performance index parameter includes received power and/or a received signal to noise ratio.

Optionally receiving, by the receiving device, the transmission beam training signals corresponding to the transmission beams from the transmitting device using at least one reception beam includes: when the receiving device is not provided with any selected reception beam information, then receiving, by the receiving device, the transmission beam training signals corresponding to the transmission beams from the transmitting device using any one or more reception beams; or when the receiving device is provided with selected reception beam information, and receives a transmission beam training signal corresponding to one transmission beam using one reception beam, then receiving, by the receiving device, the transmission beam training signals corresponding to the transmission beams from the transmitting device using reception beams corresponding to the selected reception beam information; or when the receiving device is provided with selected reception beam information, and receives a transmission beam training signal corresponding to one transmission beam using a plurality of reception beams, then receiving, by the receiving device, a transmission beam training signal corresponding to each of the transmission beams from the transmitting device using a plurality of reception beams corresponding to the selected reception beam information.

Optionally after the receiving device selects at least one of the transmission beams corresponding to the transmission beam training signals, and before the receiving device feeds the transmission beam information report determined according to the selected transmission beam back to the transmitting device, the method further includes: when the first transmission beam information includes a transmitting device identification number, then placing, by the receiving device, an identification number of a transmitting device providing the selected transmission beam in the transmission beam information report.

Optionally before the receiving device receives the reception beam training signals transmitted by the transmitting device using the at least one reception beam, the method further includes: determining, by the receiving device, second transmission beam information; and receiving, by the receiving device, the reception beam training signals transmitted by the transmitting device using the at least one reception beam includes: receiving, by the receiving device, the reception beam training signals transmitted by the transmitting device using the at least one reception beam according to the second transmission beam information.

Optionally determining, by the receiving device, the second transmission beam information includes: receiving, by the receiving device, the second transmission beam information from the transmitting device.

Optionally receiving, by the receiving device, the reception beam training signals corresponding to the at least one transmission beam from the transmitting device using the at least one reception beam includes: receiving, by the receiving device, a beam training signal corresponding to one transmission beam from the transmitting device by receiving a plurality of reception beam training signals corresponding to one transmission beam repeatedly using a plurality of reception beams, wherein one reception beam training signal corresponding to one transmission beam is received using one reception beam each time; or receiving, by the receiving device, a reception beam training signal corresponding to one transmission beam from the transmitting device by receiving the reception beam training signal corresponding to one transmission beam using a plurality of reception beams.

In a third aspect, an embodiment of the invention provides a beam training device including:

a first beam determining module configured to determine transmission beams corresponding to transmission beam training signals;

a transmitting module configured to transmit the transmission beam training signals to a receiving device using the transmission beams determined by the first beam determining module, and to transmit reception beam training signals to the receiving device using at least one transmission beam determined by a second beam determining module; and the second beam determining module configured to determine the at least one transmission beam corresponding to the reception beam training signals.

Optionally the second beam determining module is configured: to determine the at least one transmission beam corresponding to the reception beam training signals according to a received transmission beam information report fed back by the receiving device.

Optionally the transmitting module is further configured: to transmit data to the receiving device using the at least one transmission beam determined according to the transmission beam information report fed back by the receiving device before a transmission beam information report to be fed back by the receiving device next time is received.

Optionally the transmission beams corresponding to the transmission beam training signals includes: a part or all of transmission beams, wherein the part of transmission beams are transmission beams in at least one direction selected from all transmission beams; and/or transmission beams in adjacent directions of the at least one transmission beam determined by the first beam determining module according to a received transmission beam information report fed back by the receiving device, wherein the at least one transmission beam corresponding to the transmission beam information report is at least one transmission beam selected by the receiving device according to the received transmission beam training signals.

Optionally the transmitting module is further configured: to transmit first transmission beam information corresponding to the transmission beams to the receiving device, so that the receiving device receives the beam training signals corresponding to the transmission beams according to the first transmission beam information; and/or to transmit second transmission beam information corresponding to the transmission beams to the receiving device, so that the receiving device receives the determined reception beam training signals corresponding to the transmission beams according to the second transmission beam information.

Optionally the first transmission beam information includes a part or all of: the number of transmission beam training signals, a sequence of each of the transmission beam training signals, a resources occupied by each of the transmission beam training signals, a periodicity of each of the transmission beam training signals, triggering information of each of the transmission beam training signals, start information of each of the reception beam training signals, end information of each of the reception beam training signals, and a transmitting device identification number corresponding to each of the transmission beam training signals.

Optionally the transmitting module is further configured: to transmit second transmission beam information corresponding to the transmission beams to the receiving device, so that the receiving device receives the determined reception beam training signals corresponding to the transmission beams according to the second transmission beam information.

Optionally the second transmission beam information includes a part or all of: the number of reception beam training signals, a sequence of each of the reception beam training signals, a resource occupied by each of the reception beam training signals, a periodicity of each of the reception beam training signals, triggering information of each of the reception beam training signals, start information of each of the reception beam training signals, end information of each of the reception beam training signals, and a transmitting device identification number corresponding to each of the reception beam training signals.

Optionally the transmitting module is configured: to place the first transmission beam information and the second transmission beam information in different signaling, and to transmit the signaling to the receiving device: or to place the first transmission beam information and the second transmission beam information in the same signaling, and to transmit the signaling to the receiving device.

Optionally the transmitting module is configured: when the receiving device receives a reception beam training signal corresponding to one transmission beam using one reception beam, to transmit the reception beam training signal repeatedly.

Optionally the second beam determining module is further configured: when the received transmission beam information report includes a transmitting device identification number, to determine a transmitting device, which provides the transmission beam corresponding to the received transmission beam information report, according to the transmitting device identification number; and when the received transmission beam information does not include any transmitting device identification number, but includes a transmission beam training signal index, to determine a transmitting device, which provides the transmission beam corresponding to the received transmission beam information report, according to a correspondence relationship between the transmission beam training signal index in the transmission beam information report, and the transmitting device providing the transmission beam.

Optionally the transmitting module is further configured: to perform periodically or aperiodically the step of transmitting the transmission beam training signals to the receiving device using the transmission beams determined by the first beam determining module; and/or to perform periodically or aperiodically the step of transmitting the reception beam training signals to the receiving device using the at least one transmission beam determined by the second beam determining module.

In a fourth aspect, an embodiment of the invention provides a beam training device including:

a signal receiving module configured to receive transmission beam training signals corresponding to transmission beams from a transmitting device using at least one reception beam, and to receive reception beam training signals transmitted by the transmitting device using at least one reception beam;

a first processing module configured to select at least one of the transmission beams corresponding to the transmission beam training signals, and to feed a transmission beam information report determined according to the selected at least one transmission beam back to the transmitting device; and a second processing module configured to determine at least one reception beam as a selected reception beam according to the reception beam training signals received.

Optionally the signal receiving module is further configured: to receive data from the transmitting device using the selected reception beam before reception beam training signals are received next time.

Optionally the transmission beam information report includes a resource index of the beam training signal determined according to the selected transmission beam.

Optionally the signal receiving module is further configured: to determine first transmission beam information; and to receive the transmission beam training signals corresponding to the transmission beams from the transmitting device using the at least one reception beam according to the first transmission beam information.

Optionally the signal receiving module is configured to receive the first transmission beam information from the transmitting device.

Optionally the first processing module is configured: to select at least one transmission beam or transmission beam training signal index from the transmission beams corresponding to the beam training signals according to performance index parameters of the received transmission beam training signals; and/or the second processing module is configured: to determine at least one reception beam as a selected reception beam according to performance index parameters of the reception beam training signals received using the at least one reception beam.

Optionally the performance index parameter includes received power and/or a received signal to noise ratio.

Optionally the signal receiving module is further configured: when the receiving device is not provided with any selected reception beam information, to receive the transmission beam training signals corresponding to the transmission beams from the transmitting device using any one or more reception beams; or when the receiving device is provided with selected reception beam information, and receives a transmission beam training signal corresponding to one transmission beam using one reception beam, to receive the transmission beam training signals corresponding to the transmission beams from the transmitting device using reception beams corresponding to the selected reception beam information; or when the receiving device is provided with selected reception beam information, and receives a transmission beam training signal corresponding to one transmission beam using a plurality of reception beams, to receive a transmission beam training signal corresponding to each of the transmission beams from the transmitting device using a plurality of reception beams corresponding to the selected reception beam information.

Optionally the first processing module is further configured: when the first transmission beam information includes a transmitting device identification number, to place an identification number of a transmitting device providing the selected transmission beam in the transmission beam information report.

Optionally the signal receiving module is further configured: to determine second transmission beam information: and to receive the reception beam training signals transmitted by the transmitting device using the at least one reception beam according to the second transmission beam information.

Optionally the signal receiving module is configured to receive the second transmission beam information from the transmitting device.

Optionally the signal receiving module is configured: to receive beam training signals corresponding to one transmission beam from the transmitting device by receiving a plurality of reception beam training signals corresponding to one transmission beam repeatedly using a plurality of reception beams, wherein one reception beam training signal corresponding to one transmission beam is received using one reception beam each time; or to receive reception beam training signals corresponding to one transmission beam from the transmitting device by receiving reception beam training signals corresponding to one transmission beam using a plurality of reception beams.

In a fifth aspect, an embodiment of the invention provides a transmitting device including: a processor, a memory, and a transceiver, where the transceiver is configured to receive and transmit data under the control of the processor, the memory is configured to store preset program, and the processor is configured to read the program in the memory, and to perform any one of the methods according to the first aspect.

In a sixth aspect, an embodiment of the invention provides a receiving device including: a processor, a memory, and a transceiver, where the transceiver is configured to receive and transmit data under the control of the processor, the memory is configured to store preset program, and the processor is configured to read the program in the memory, and to perform any one of the methods according to the second aspect.

In a seventh aspect, an embodiment of the invention provides a computer storage medium storing computer executable instructions configured to cause the computer to perform any one of the methods according to the first aspect.

In an eighth aspect, an embodiment of the invention provides a computer storage medium storing computer executable instructions configured to cause the computer to perform any one of the methods according to the second aspect.

In the embodiments of the invention, the transmitting device transmits the beam training signals twice, and repeats this process, where firstly the transmission beam training signals are transmitted so that the receiving device receives the transmission beam training signals using the selected reception beam, and selects and reports at least one of the transmission beams, and secondly the transmitting device transmits the reception beam training signals according to the transmission beam information report of the receiving device to train the reception beam of the receiving device. In the embodiments of the invention, the optimum transmission and reception beams are searched for progressively through interactive beam training instead of training all the beams once to thereby save the time and overhead of beam training, and improve the efficiency.

BRIEF DESCRIPTION OF THE DRAWINGS

In order to make the technical solutions according to the embodiments of the invention more apparent, the drawings to which reference is to be made in the description of the embodiments will be introduced below in brief, and apparently the drawings to be described below illustrate only some embodiments of the invention. Based upon these drawings, other drawings can further occur to those ordinarily skilled in the art without any inventive effort.

DETAILED DESCRIPTION

In order to make the objects, technical solutions, and advantages of the invention more apparent, the invention will be described below in further details with reference to the drawings, and apparently the embodiments to be described below are only a part but not all of the embodiments of the invention. Based upon the embodiments here of the invention, all the other embodiments which can occur to those ordinarily skilled in the art without any inventive effort shall fall into the scope of the invention.

Figure 1A:
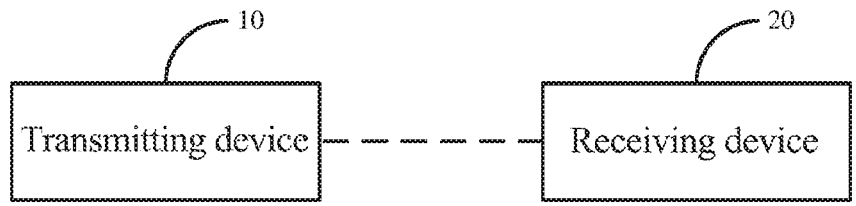
FIG. 1A is a schematic structural diagram of a beam training system according to an embodiment of the invention.

As illustrated in FIG. 1A, a beam training system according to an embodiment of the invention includes: a transmitting device 10 and a receiving device 20.

The transmitting device 10 is configured to determine transmission beams corresponding to transmission beam training signals, and to transmit the transmission beam training signals to the receiving device using the transmission beams corresponding to the transmission beam training signals; and to determine at least one transmission beam corresponding to reception beam training signals, and to transmit the reception beam training signals to the receiving device using the at least one transmission beam corresponding to the reception beam training signals.

The receiving device 20 is configured to receive the transmission beam training signals corresponding to the transmission beams from the transmitting device using at least one reception beam, to select at least one of the transmission beams corresponding to the transmission beam training signals, and to feed back to the transmitting device a transmission beam information report determined according to the selected transmission beam; and to receive the reception beam training signals transmitted by the transmitting device using at least one reception beam, and to determine at least one reception beam as a selected reception beam according to the reception beam training signals received using the at least one reception beam.

In the embodiment of the invention, the transmitting device transmits the beam training signals twice, and repeats this process, where firstly the transmission beam training signals are transmitted so that the receiving device receives the transmission beam training signals using the selected reception beam, and selects and reports at least one of the transmission beams, and secondly the transmitting device transmits the reception beam training signals according to the transmission beam information report fed back by the receiving device to train the reception beam of the receiving device. In the embodiment of the invention, the optimum transmission beam and reception beam are searched for progressively through interactive beam training instead of training all the beams once, to thereby save the time and overhead of beam training, and improve the efficiency.

Here when the transmitting device is a network-side device, then the receiving device is a user equipment; and when the transmitting device is a user equipment, then the receiving device is a network-side device.

The network-side device can be a Tx/Rx Point (TRP), e.g., a base station (e.g., a macro base station, a home base station, etc.), or can be another network-side device.

Optionally the transmitting device can determine the transmission beam(s) corresponding to the reception beams training signals in a number of ways. For example, the transmitting device can determine the at least one transmission beam corresponding to the reception beam training signals according to the received transmission beam information report fed back by the receiving device. Optionally the transmitting device can determine the at least one transmission beam corresponding to the reception beam training signals according to a lastly received transmission beam information report fed back by the receiving device. In another example, the transmitting device can determine the at least one transmission beam corresponding to the reception beam training signals directly.

In an implementation, the transmitting device performs periodically or aperiodically the step of transmitting the transmission beam training signals to the receiving device using the transmission beams; and/or the transmitting device performs periodically or aperiodically the step of transmitting the reception beam training signals to the receiving device using the determined transmission beam.

Here the transmitting device performs the step of transmitting the transmission beam training signals to the receiving device using the transmission beams (or simply performs the step of transmitting the transmission beam training signals) at the same or different periodicity as the periodicity at which it performs the step of transmitting the reception beam training signals to the receiving device using the determined transmission beam (or simply performs the step of transmitting the reception beam training signals).

Alternatively the step of transmitting the transmission beam training signals may be performed periodically, and the step of transmitting the reception beam training signals may be performed aperiodically; or the step of transmitting the transmission beam training signals may be performed aperiodically, and the step of transmitting the reception beam training signals may be performed periodically.

Transmission of the transmission beam training signals, and transmission of the reception beam training signals, by the transmitting device will be described below respectively.

I. The transmitting device transmits beam training signals.

Before the transmitting device transmits the transmission beam training signals corresponding to the transmission beams to the receiving device, the transmitting device determines the transmission beams.

Specifically the transmitting device can determine a part or all of the transmission beams, and transmit the transmission beam training signals corresponding to the part or all of the transmission beams to the receiving device; or the transmitting device can determine transmission beams in adjacent directions of the transmission beam determined according to the received transmission beam information report fed back by the receiving device, and transmit the transmission beam training signals corresponding to the determined at least one transmission beam to the receiving device, where the at least one transmission beam corresponding to the transmission beam information report is at least one transmission beam selected by the receiving device according to the received transmission beam training signals.

Optionally the transmitting device can determine transmission beams in adjacent directions of the at least one transmission beam according to a lastly received transmission beam information report fed back by the receiving device. The lastly received transmission beam information report can be a transmission beam information report lastly fed back by the receiving device.

When the transmitting device transmits the transmission beam training signal for the first time, then it may determine a part or all of the transmission beams; and when the transmitting device transmits the transmission beam training signal for other than the first time, then it may determine the transmission beams in either of the two implementations above, and the specific implementation may be determined by the transmitting device, or configured manually, or configured at a higher layer.

Optionally the transmitting device can determine a part of the transmission beams by selecting transmission beams in at least one direction from all the transmission beams, and transmit the transmission beam training signals corresponding to the selected transmission beams to the receiving device.

It shall be noted that the two implementations in which a part of the transmission beams are determined have been described only by way of an example, but any other implementation in which a part of the transmission beams can be determined will be applicable in the embodiment of the invention.

Optionally when the transmitting device determines the at least one transmission beam according to the received transmission beam information report, the transmitting device can determine the at least one transmission beam selected by the receiving device according to the received transmission beam information report, and determine a part or all of the transmission beams among all transmission beams adjacent to the transmission beams selected by the receiving device.

Optionally when the transmitting device determines the at least one transmission beam according to the lastly received transmission beam information report, the transmitting device can determine the transmission beam selected by the receiving device according to the lastly received transmission beam information report.

In an implementation, when the transmission beam information report received by the transmitting device includes transmitting device identification number(s), then the transmitting device determines transmitting device(s), which provides the transmission beam(s) corresponding to the received transmission beam information report, according to the transmitting device identification number(s). When the transmission beam information report received by the transmitting device does not include any transmitting device identification number(s), but includes transmission beam training signal index(es), then the transmitting device determines transmitting device(s), which provides the transmission beam(s) corresponding to the received transmission beam information report, according to a correspondence relationship between the transmission beam training signal index in the transmission beam information report and the transmitting device which provides the transmission beam.

The correspondence relationship between the transmission beam training signal index and the transmitting device which provides the transmission beam can be preset. The transmitting device can determine transmitting device(s) corresponding to the transmission beam training signal index(es) in the transmission beam information report according to the correspondence relationship, where the transmitting device is a transmitting device, which provides the transmission beam corresponding to the received transmission beam information report.

In an implementation, before the transmitting device receives a transmission beam information report to be fed back by the receiving device next time, the transmitting device transmits data to the receiving device using the transmission beam(s) determined according to the transmission beam information report fed back by the receiving device.

Optionally in an implementation, before the transmitting device receives a transmission beam information report to be fed back by the receiving device next time, the transmitting device transmits data to the receiving device using the transmission beam(s) determined according to the transmission beam information lastly report fed back by the receiving device. The lastly received transmission beam information report fed back by the receiving device includes the transmission beam(s) selected by the receiving device according to the received transmission beam training signals.

The transmitting device performs periodically or aperiodically the step of transmitting the transmission beam training signals corresponding to the transmission beams to the receiving device; and/or the transmitting device performs periodically or aperiodically the step of transmitting the reception beam training signal(s) corresponding to the determined transmission beam(s) to the receiving device.

Optionally before the transmitting device transmits the transmission beam training signals to the receiving device using the transmission beams corresponding to the transmission beam training signals, the transmitting device transmits transmission beam information of the transmission beams corresponding to the transmission beam training signals (referred hereinafter to as first transmission beam information for the sake of a convenient description), so that the receiving device receives the beam training signals corresponding to the transmission beams according to the first transmission beam information.

Here the first transmission beam information includes a part or all of: the number of transmission beam training signals, a sequence of each of the transmission beam training signals, a resource occupied by each of the transmission beam training signals, a periodicity of each of the transmission beam training signals, triggering information of each of the transmission beam training signals, start information of each the reception beam training signals, end information of each of the reception beam training signals, and a transmitting device identification number corresponding to each transmission beam training signal.

Optionally before the transmitting device transmits the determined reception beam training signal(s) corresponding to the transmission beam(s) to the receiving device, the transmitting device transmits transmission beam information of the transmission beams (referred hereinafter to as second transmission beam information for the sake of a convenient description) to the receiving device, so that the receiving device receives the determined reception beam training signal(s) corresponding to the transmission beam(s) according to the second transmission beam information. Correspondingly the receiving device receives the second transmission beam information from the transmitting device, and receives the reception beam training signal(s), corresponding to the transmission beam(s), determined by the transmitting device according to the transmission beam information report, using at least one reception beam according to the second transmission beam information.

In an implementation, alternatively the receiving device can determine the second transmission beam information by itself. Furthermore the receiving device can transmit the second transmission beam information determined by the receiving device to the transmitting device.

Here the second transmission beam information includes apart or all of: the number of reception beam training signals, a sequence of each of the reception beam training signals, a resource occupied by each of the reception beam training signals, a periodicity of each of the reception beam training signals, triggering information of each of the reception beam training signals, start information of each of the reception beam training signals, end information of each of the reception beam training signals, and a transmitting device identification number corresponding to each reception beam training signal.

Here when there are a plurality of different reception beam training signals, then the different reception beam training signals may be provided by different transmitting devices.

In an implementation, the transmitting device can place the first transmission beam information and the second transmission beam information in different signaling, and transmit the signaling to the receiving device; or the transmitting device can place the first transmission beam information and the second transmission beam information in the same signaling, and transmit the signaling to the receiving device.

When the transmitting device places the first transmission beam information and the second transmission beam information in the same signaling, and transmits the signaling to the receiving device, then:

1. The resources, occupied by the transmission beam training signals, in the first transmission beam information can be specific resources, and the resources, occupied by the reception beam training signals, in the second transmission beam information can be different resources from the resources occupied by the transmission beam training signals.

2. The resources, occupied by the reception beam training signals, in the second transmission beam information can be specific resources, and the resources, occupied by the transmission beam training signals, in the first transmission beam information can be different resources from the resources occupied by the reception beam training signals.

3. The resources, occupied by the transmission beam training signals, in the first transmission beam information can be specific resources, and the resources, occupied by the reception beam training signals, in the second transmission beam information can be specific resources.

When the first transmission beam information and the second transmission beam information is in the same signaling, then the signaling may have a plurality of structures. For example, the signaling may include contents of the first transmission beam information, and contents of the second transmission beam information respectively; and for example, the contents of the first transmission beam information include A, B, and C. and the contents of the second transmission beam information include C, D, and E, so the signaling may include A, B, and C, and C, D. and E.

In another example, the signaling may include contents of the same part of the first transmission beam information as the second transmission beam information, the contents of the first transmission beam information different from the second transmission beam information, and the contents of the second transmission beam information different from the first transmission beam information; and for example, the contents of the first transmission beam information includes A, B, and C, and the contents of the second transmission beam information includes C. D, and E, so the signaling includes C. A and B, and D and E.

It shall be noted that the implementations above have been described only by way of an example, but any signaling structure may be applicable in the embodiment of the invention as long as the receiving device can determine the first transmission beam information and the second transmission beam information according to the contents of the signaling.

When the second transmission beam information does not include second beam training sequence start information and/or second beam training sequence end information, then the receiving device may notify the transmitting device in at least one of the following implementations.

1. The receiving device notifies the transmitting device of the number of times that a second beam training sequence is transmitted, and/or the time length of the second beam training sequence.

2. The receiving device notifies the transmitting device of a start time and/or an end time of a second beam training sequence.

It shall be noted that the two implementations above have been described only by way of an example, but any implementation in which the transmitting device and the receiving device can determine the second beam training sequence start information and/or the second beam training sequence end information may be applicable in the embodiment of the invention.

In an implementation, the receiving device can receive the reception beam training signals using at least one reception beam.

When the receiving device can only receive one transmission beam training signal using one reception beam, then the transmitting device transmits the reception beam training signal repeatedly, and the receiving device receives the respective reception beam training signals using different reception beams.

Specifically when the receiving device receives the reception beam training signal corresponding to one transmission beam using one reception beam, then the transmitting device transmits the reception beam training signal corresponding to the transmission beam multiple times.

Correspondingly when the receiving device receives reception beam training signal, corresponding to one transmission beam, from the transmitting device, the receiving device receives a plurality of reception beam training signals corresponding to one transmission beam multiple times using a plurality of reception beams, where one reception beam training signal corresponding to one transmission beam is received using one reception beam each time.

Optionally when the receiving device determines the selected reception beam from the reception beams according to the reception beam training signals, the receiving device selects one of the reception beams according to performance index parameters of the reception beam training signals received using the at least one reception beam, determining the selected reception beam as a selected reception beam, and determining information about the selected reception beam as selected reception beam information.

Optionally the performance index parameter includes but will not be limited to received power and a received signal to noise ratio.

For example, the receiving device measures received power of each reception beam training signal received using the at least one reception beam, and can select from the reception beam training signals with the received power above a threshold, or can select the reception beam training signal with the highest received power.

After the selected reception beam is determined, the receiving device can receive a signal of the transmitting device using the selected reception beam until a selected reception beam is determined again next time.

The solution according to the embodiment of the invention will be described below by way of a downlink example.

Figure 1B:
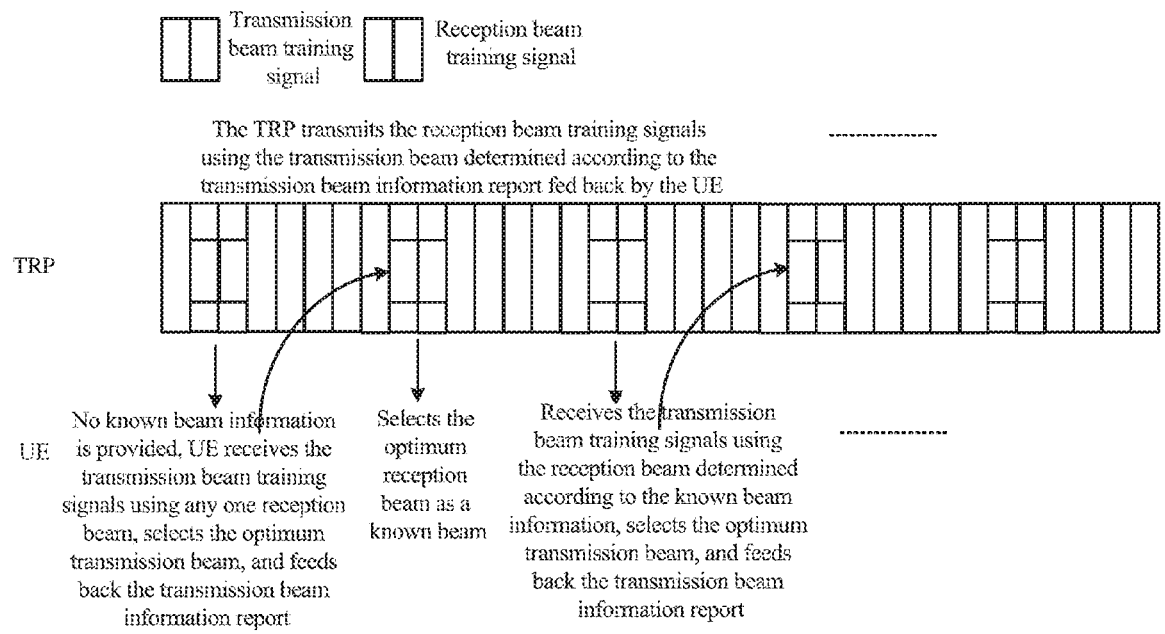
FIG. 1B is a schematic diagram of downlink interactive beam training according to the embodiment of the invention.

FIG. 1B is a schematic diagram of downlink interactive beam training according to an embodiment of the invention.

As illustrated, each transmission beam training signal occupies an Orthogonal Frequency Division Multiplexing (OFDM) symbol, and for example, a User Equipment (UE) (also referred to as a terminal) can only receive one transmission beam training signal using one reception beam each time.

In the step 1, a Tx/Rx Point (TRP) notifies a UE of first transmission beam information of transmission beam training signals, corresponding to transmission beams, to be transmitted, via signaling.

Here the first transmission beam information includes but will not be limited to: the number of transmission beam training signals (e.g., 2 in this example), a sequence of each of the transmission beam training signals, a resource occupied by each of the transmission beam training signals, a periodicity of each of the transmission beam training signals, a TRP identification number corresponding to each of the transmission beam training signals, etc.

The TRP transmits two transmission beam training signals according to the first transmission beam information.

In the step 2, the UE receives these two transmission beam training signals using any one reception beam according to indicating of the first transmission beam information.

In the step 3, the UE calculates received power of each transmission beam training signal, selects the transmission beam training signal corresponding to the higher received power, and feeds an index corresponding thereto back to the TRP in a transmission beam information report.

In the step 4, the TRP determines a transmission beam selected by the UE according to the received transmission beam information report fed back by the UE upon reception of the transmission beam information report.

In the step 5, the TRP notifies the UE of second transmission beam information of reception beam training signals corresponding to the selected transmission beam via signaling.

Here the second transmission beam information includes but will not be limited to: the number of reception beam training signals (e.g., 2 in this example), start information of the reception beam training signals, end information of the reception beam training signals, a sequence of each of the reception beam training signals, a resource occupied by each of the reception beam training signals, a periodicity of each of the reception beam training signals, etc.

Here the number of repetitions is 2, for example. The TRP transmits the reception beam training signal corresponding to the transmission beam selected by the UE twice according to the number of repetitions.

In the step 6, the UE receives these two reception beam training signals respectively using two reception beams according to the indicating of second transmission beam information.

In the step 7, the UE calculates received power of each reception beam training signal, and selects the reception beam training signal corresponding to the higher received power.

In the step 8, the UE determines the reception beam corresponding to the selected reception beam training signal, and determines beam information of the reception beam as selected reception beam information.

The first to eighth steps above are repeated.

In an implementation, the first to eighth steps above can be repeated all the time; or when to start them, and when to stop them can be determined according to the start information and the end information in the first transmission beam information and the second transmission beam information.

Figure 2:
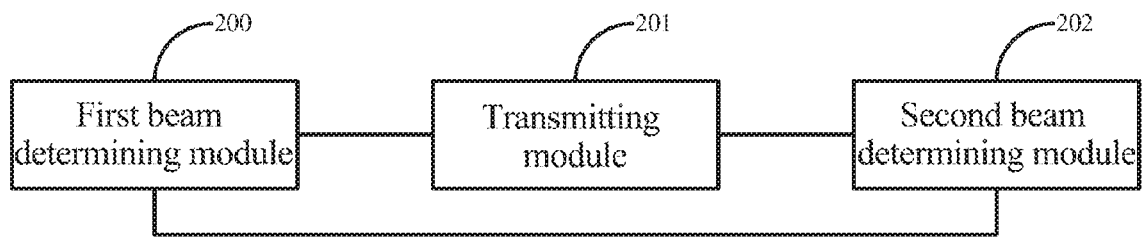
FIG. 2 is a schematic structural diagram of a first transmitting device according to an embodiment of the invention.

As illustrated in FIG. 2, a first transmitting device according to an embodiment of the invention includes the following modules.

A first beam determining module 200 is configured to determine transmission beams corresponding to transmission beam training signals.

A transmitting module 201 is configured to transmit the transmission beam training signals to a receiving device using the transmission beams determined by the first beam determining module, and to transmit reception beam training signals to the receiving device using at least one transmission beam determined by a second beam determining module.

The second beam determining module 202 is configured to determine the at least one transmission beam corresponding to the reception beam training signals.

Optionally the second beam determining module 202 is configured to determine the at least one transmission beam corresponding to the reception beam training signals according to a received transmission beam information report fed back by the receiving device.

Optionally the transmitting module 201 is further configured to transmit data to the receiving device using the at least one transmission beam determined according to the transmission beam information report fed back by the receiving device before a transmission beam information report to be fed back by the receiving device next time is received.

Optionally the transmission beams corresponding to the transmission beam training signals includes: a part or all of transmission beams, where the part of transmission beams are transmission beams in at least one direction selected from all transmission beams; and/or transmission beams in adjacent directions of the at least one transmission beam determined by the first beam determining module 200 according to a received transmission beam information report fed back by the receiving device, where the at least one transmission beam corresponding to the transmission beam information report is at least one transmission beam selected by the receiving device according to the received transmission beam training signals.

Optionally the transmitting module 201 is further configured to transmit first transmission beam information corresponding to the transmission beams to the receiving device, so that the receiving device receives the beam training signals corresponding to the transmission beams according to the first transmission beam information.

Optionally the first transmission beam information includes a part or all of: the number of transmission beam training signals, a sequence of each of the transmission beam training signals, a resource occupied by each of the transmission beam training signals, a periodicity of each of the transmission beam training signals, triggering information of each of the transmission beam training signals, start information of each of the transmission beam training signals, end information of each of the reception beam training signals, and a transmitting device identification number corresponding to each of the transmission beam training signals.

Optionally the transmitting module 201 is further configured to transmit second transmission beam information corresponding to the at least one transmission beam to the receiving device, so that the receiving device receives the determined reception beam training signals corresponding to the at least one transmission beam according to the second transmission beam information.

Optionally the second transmission beam information includes a part or all of: the number of reception beam training signals, a sequence of each of the reception beam training signals, a resource occupied by each of the reception beam training signals, a periodicity of each of the reception beam training signals, triggering information of each of the reception beam training signals, start information of each of the reception beam training signals, end information of each of the reception beam training signals, and a transmitting device identification number corresponding to each of the reception beam training signals.

Optionally the transmitting module 201 is configured to place the first transmission beam information and the second transmission beam information in different signaling, and to transmit the signaling to the receiving device; or to place the first transmission beam information and the second transmission beam information in the same signaling, and to transmit the signaling to the receiving device.

Optionally the transmitting module 201 is configured, when the receiving device receives reception beam training signals corresponding to one transmission beam using one reception beam, to transmit the reception beam training signals repeatedly.

Optionally the transmitting module 201 is further configured, when the received transmission beam information report includes a transmitting device identification number, to determine a transmitting device, which provides the transmission beam corresponding to the received transmission beam information report, according to the transmitting device identification number; and when the received transmission beam information does not include any transmitting device identification number, but includes a transmission beam training signal index, to determine the transmitting device, which provides the transmission beam corresponding to the received transmission beam information report, according to a correspondence relationship between the transmission beam training signal index in the transmission beam information report, and the transmitting device providing the transmission beam.

Optionally the transmitting module 201 is further configured to perform periodically or aperiodically the step of transmitting the transmission beam training signals to the receiving device using the transmission beams determined by the first beam determining module; and/or to perform periodically or aperiodically the step of transmitting the reception beam training signals to the receiving device using the at least one transmission beam determined by the second beam determining module.

Figure 3:
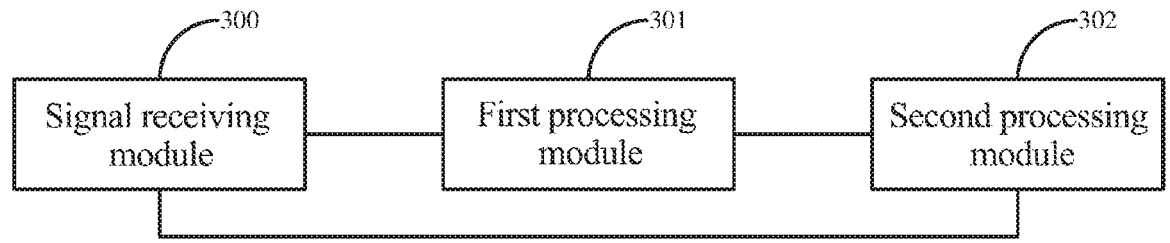
FIG. 3 is a schematic structural diagram of a first receiving device according to an embodiment of the invention.

As illustrated in FIG. 3, a first receiving device according to an embodiment of the invention includes: a signal receiving module 300 configured to receive transmission beam training signals corresponding to transmission beams from a transmitting device using at least one reception beam, and to receive reception beam training signals transmitted by the transmitting device using at least one reception beam.

A first processing module 301 is configured to select at least one of the transmission beams corresponding to the transmission beam training signals, and to feed a transmission beam information report determined according to the selected at least one transmission beam back to the transmitting device.

A second processing module 302 is configured to determine the at least one reception beam as a selected reception beam according to the reception beam training signals received.

Optionally the signal receiving module 300 is further configured to receive data from the transmitting device using the selected reception beam before reception beam training signals are received next time.

Optionally the transmission beam information report includes a resource index of the beam training signal determined according to the selected at least one transmission beam.

Optionally the signal receiving module 300 is further configured: to determine first transmission beam information; and to receive the transmission beam training signals corresponding to the transmission beams from the transmitting device using the at least one reception beam according to the first transmission beam information.

Optionally the signal receiving module 300 is configured to receive first transmission beam information from the transmitting device.

Optionally the first processing module 301 is configured: to select at least one transmission beam or transmission beam training signal index from the transmission beams corresponding to the beam training signals according to performance index parameters of the received transmission beam training signals; and/or the second processing module 302 is configured to determine at least one reception beam as a selected reception beam according to performance index parameters of the reception beam training signals received using the at least one reception beam.

Optionally the performance index parameter includes received power and/or a received signal to noise ratio.

Optionally the signal receiving module 300 is further configured: when the receiving device is not provided with any selected reception beam information, to receive the transmission beam training signals corresponding to the transmission beams from the transmitting device using any one or more reception beams; or when the receiving device is provided with selected reception beam information, and receives a transmission beam training signal corresponding to one transmission beam using one reception beam, to receive the transmission beam training signals corresponding to the transmission beams from the transmitting device using reception beams corresponding to the selected reception beam information; or when the receiving device is provided with selected reception beam information, and receives a transmission beam training signal corresponding to one transmission beam using a plurality of reception beams, to receive the transmission beam training signal corresponding to each of the transmission beams from the transmitting device using a plurality of reception beams corresponding to the selected reception beam information.

Optionally the first processing module 301 is configured, when the first transmission beam information includes a transmitting device identification number, to place an identification number of a transmitting device providing the selected transmission beam in the transmission beam information report.

Optionally the signal receiving module 300 is further configured: to determine second transmission beam information; and to receive the reception beam training signals transmitted by the transmitting device using the at least one reception beam according to the second transmission beam information.

Optionally the signal receiving module 300 is configured to receive the determined second transmission beam information from the transmitting device.

Optionally the signal receiving module 300 is configured to receive reception beam training signals corresponding to one transmission beam from the transmitting device by receiving a plurality of reception beam training signals corresponding to one transmission beam repeatedly using a plurality of reception beams, where one reception beam training signal corresponding to one transmission beam is received using one reception beam each time; or to receive reception beam training signals corresponding to one transmission beam from the transmitting device by receiving reception beam training signals corresponding to one transmission beam using a plurality of reception beams.

In an implementation, a network-side device can be a transmitting device, or can be a receiving device; or a terminal can be a transmitting device, or can be a receiving device. Hereupon the functions of the transmitting device in FIG. 2, and the receiving device in FIG. 3 can be integrated in an entity (that is, the modules of the transmitting device and the receiving device can be integrated in an entity), and the functions of the transmitting device, or the functions of the receiving devices can be selected and performed as needed.

Figure 4:
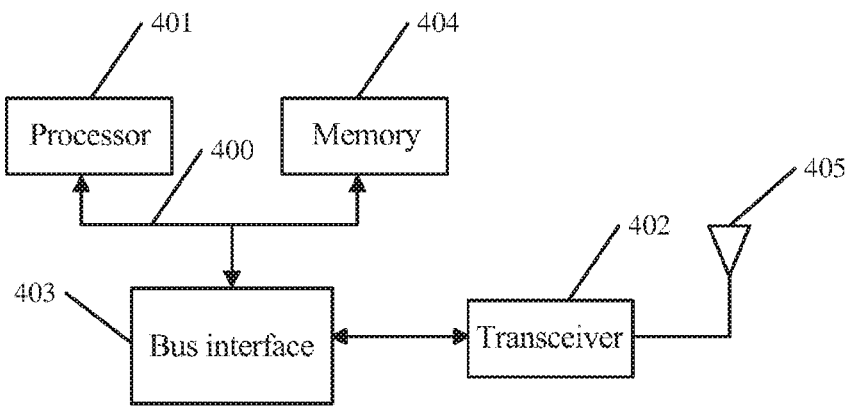
FIG. 4 is a schematic structural diagram of a second transmitting device according to an embodiment of the invention.

As illustrated in FIG. 4, a second transmitting device according to an embodiment of the invention includes the followings.

A processor 401 is configured to read and execute program in a memory 404: to determine transmission beams corresponding to transmission beam training signals; to transmit the transmission beam training signals to a receiving device using the transmission beams determined by the processor through a transceiver 402, and to transmit reception beam training signals to the receiving device using at least one transmission beam determined by the processor through the transceiver 402; and to determine the at least one transmission beam corresponding to the reception beam training signals.

The transceiver 402 is configured to receive and transmit data under the control of the processor 401.

Optionally the processor 401 is configured to determine the at least one transmission beam corresponding to the reception beam training signals according to a received transmission beam information report fed back by the receiving device.

Optionally the processor 401 is further configured to transmit data to the receiving device using the at least one transmission beam determined according to the transmission beam information report fed back by the receiving device before a transmission beam information report to be fed back by the receiving device next time is received.

Optionally the transmission beams corresponding to the transmission beam training signals includes: a part or all of transmission beams, where the part of the transmission beams are transmission beams in at least one direction selected from all the transmission beams; and/or transmission beams in adjacent directions of the transmission beam determined by the processor according to the received transmission beam information report fed back by the receiving device, where the transmission beam corresponding to the transmission beam information report is transmission beam selected by the receiving device according to the received transmission beam training signals.

Optionally the processor 401 is further configured to transmit first transmission beam information corresponding to the transmission beams to the receiving device, so that the receiving device receives the beam training signals corresponding to the transmission beams according to the first transmission beam information.

Optionally the first transmission beam information includes a part or all of: the number of transmission beam training signals, a sequence of each of the transmission beam training signals, a resource occupied by each of the transmission beam training signals, a periodicity of each of the transmission beam training signals, triggering information of each of the transmission beam training signals, start information of each of the reception beam training signals, end information of each of the reception beam training signals, and a transmitting device identification number corresponding to each of the transmission beam training signals.

Optionally the processor 401 is further configured to transmit second transmission beam information corresponding to the transmission beam(s) to the receiving device, so that the receiving device receives the determined reception beam training signals corresponding to the transmission beam(s) according to the second transmission beam information.

Optionally the second transmission beam information includes a part or all of: the number of reception beam training signals, a sequence of each of the reception beam training signals, a resource occupied by each of the reception beam training signals, a periodicity of each of the reception beam training signals, triggering information of each of the reception beam training signals, start information of each of the reception beam training signals, end information of each of the reception beam training signals, and a transmitting device identification number corresponding to each of the reception beam training signals.

Optionally the processor 401 is configured to place the first transmission beam information and the second transmission beam information in different signaling, and to transmit the signaling to the receiving device; or to place the first transmission beam information and the second transmission beam information in the same signaling, and to transmit the signaling to the receiving device.

Optionally the processor 401 is configured, when the receiving device receives reception beam training signals corresponding to one transmission beam using one reception beam, to transmit the reception beam training signals repeatedly.

Optionally the processor 401 is further configured, when the received transmission beam information report includes a transmitting device identification number, to determine a transmitting device, which provides the transmission beam corresponding to the received transmission beam information report, according to the transmitting device identification number; and when the received transmission beam information does not include any transmitting device identification number, but includes a transmission beam training signal index, to determine a transmitting device, which provides the transmission beam corresponding to the received transmission beam information report, according to a correspondence relationship between the transmission beam training signal index in the transmission beam information report, and the transmitting device providing the transmission beam.

Optionally the processor 401 is further configured to perform periodically or aperiodically the step of transmitting the transmission beam training signals to the receiving device using the transmission beams determined by the processor; and/or to perform periodically or aperiodically the step of transmitting the reception beam training signals to the receiving device using the at least one transmission beam determined by the processor.

Here the processor 401 interacts with the receiving device through the transceiver 402.

In FIG. 4, in the bus architecture (represented as the bus 400), the bus 400 can include any number of interconnecting buses and bridges to particularly link together various circuits including one or more processors represented by the processor 401, and one or more memories represented by the memory 404. The bus 400 can further link together various other circuits, e.g., a peripheral device, a manostat, a power management circuit, etc., all of which are well known in the art, so a further description thereof will be omitted in this context. The bus interface 403 serves as an interface between the bus 400 and the transceiver 402. The transceiver 402 can be an element, or can be a number of elements, e.g., a transmitter and a receiver, which are units for communication with various other devices over a transmission medium. Data processed by the processor 401 are transmitted over a radio medium through the antenna 405, and furthermore the antenna 404 further receives and transmits data to the processor 401.

Optionally the processor 401 is responsible for managing the bus 400 and performing normal processes, and can further provide various functions including timing, a peripheral interface, voltage regulation, power source management, and other control functions, and the memory 404 can be configured to store data for use by the processor 401 in performing the operations.

Optionally the processor 401 can be a Central Processing Unit (CPU), an Application Specific Integrated Circuit (ASIC), a Field Programmable Gate Array (FPGA), or a Complex Programmable Logic Device (CPLD).

Figure 5:
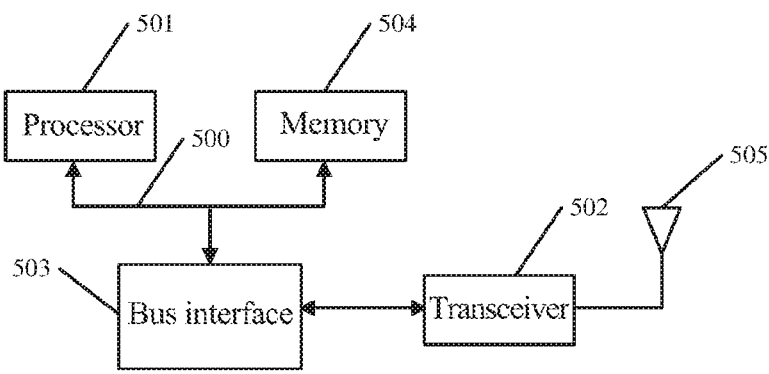
FIG. 5 is a schematic structural diagram of a second receiving device according to an embodiment of the invention.

As illustrated in FIG. 5, a second receiving device according to an embodiment of the invention includes the followings.

A processor 501 is configured to read and execute program in a memory 504: to receive transmission beam training signals corresponding to transmission beams from a transmitting device using at least one reception beam, and to receive reception beam training signals transmitted by the transmitting device using at least one reception beam, through a transceiver 502; to select at least one of the transmission beams corresponding to the transmission beam training signals, and to feed a transmission beam information report determined according to the selected at least one transmission beam back to the transmitting device through the transceiver 502; and to determine at least one reception beam as a selected reception beam according to the reception beam training signals received using the at least one reception beam through the transceiver 502.

The transceiver 502 is configured to receive and transmit data under the control of the processor 501.

Optionally the processor 501 is further configured to receive data from the transmitting device using the selected reception beam before reception beam training signals are received next time.

Optionally the transmission beam information report includes a resource index of the beam training signal determined according to the selected at least one transmission beam.

Optionally the processor 501 is further configured: to determine first transmission beam information; and to receive the transmission beam training signals corresponding to the transmission beams from the transmitting device using the at least one reception beam according to the first transmission beam information.

Optionally the processor 501 is configured to receive first transmission beam information from the transmitting device.

Optionally the processor 501 is configured: to select at least one transmission beam or transmission beam training signal index from the transmission beams corresponding to the beam training signals according to performance index parameters of the received transmission beam training signals; and/or the processor 501 is configured to determine at least one of the reception beams as a selected reception beam according to performance index parameters of the reception beam training signals received using the at least one reception beam.

Optionally the performance index parameter includes received power and/or a received signal to noise ratio.

Optionally the processor 501 is further configured: when the receiving device is not provided with any selected reception beam information, to receive the transmission beam training signals corresponding to the transmission beams from the transmitting device using any one or more reception beams; or when the receiving device is provided with selected reception beam information, and receives a transmission beam training signal corresponding to one transmission beam using one reception beam, to receive the transmission beam training signals corresponding to the transmission beams from the transmitting device using reception beams corresponding to the selected reception beam information; or when the receiving device is provided with selected reception beam information, and receives a transmission beam training signal corresponding to one transmission beam using a plurality of reception beams, to receive the transmission beam training signals corresponding to the transmission beams from the transmitting device using a plurality of reception beams corresponding to the selected reception beam information.

Optionally the processor 501 is configured, when the first transmission beam information includes a transmitting device identification number, to place an identification number of a transmitting device providing the selected transmission beam in the transmission beam information report.

Optionally the processor 501 is further configured: to determine second transmission beam information; and to receive the reception beam training signals transmitted by the transmitting device using the at least one reception beam according to the second transmission beam information.

Optionally the processor 501 is configured to receive the determined second transmission beam information from the transmitting device.

Optionally the processor 501 is configured to reception beam training signals corresponding to one transmission beam from the transmitting device by receiving a plurality of reception beam training signals corresponding to one transmission beam repeatedly using a plurality of reception beams, where one reception beam training signal corresponding to one transmission beam is received using one reception beam each time; or to receive reception beam training signals corresponding to one transmission beam from the transmitting device by receiving reception beam training signals corresponding to one transmission beam using a plurality of reception beams.

Here the processor 501 interacts with the transmitting device through the transceiver 502.

In FIG. 5, in the bus architecture (represented as the bus 500), the bus 500 can include any number of interconnecting buses and bridges to particularly link together various circuits including one or more processors represented by the processor 501, and one or more memories represented by the memory 504. The bus 500 can further link together various other circuits, e.g., a peripheral device, a manostat, a power management circuit, etc., all of which are well known in the art, so a further description thereof will be omitted in this context. The bus interface 503 serves as an interface between the bus 500 and the transceiver 502. The transceiver 502 can be an element, or can be a number of elements, e.g., a transmitter and a receiver, which are units for communication with various other devices over a transmission medium. Data processed by the processor 501 are transmitted over a radio medium through the antenna 505, and furthermore the antenna 505 further receives and transmits data to the processor 501.

Optionally the processor 501 is responsible for managing the bus 500 and performing normal processes, and can further provide various functions including timing, a peripheral interface, voltage regulation, power source management, and other control functions, and the memory 504 can be configured to store data for use by the processor 501 in performing the operations.

Optionally the processor 501 can be a CPU, an ASIC, an FPGA, or a CPLD.

In an implementation, a network-side device can be a transmitting device, or can be a receiving device; or a terminal can be a transmitting device, or can be a receiving device. Hereupon the functions of the transmitting device in FIG. 4, and the receiving device in FIG. 5 can be integrated in an entity (that is, the modules of the transmitting device and the receiving device can be integrated in an entity), and the functions of the transmitting device, or the functions of the receiving devices can be selected and performed as needed. For example, the processor 401, the transceiver 402, the processor 501, and the transceiver 502 can be integrated in an entity; or the processor 401 and the processor 501 can be integrated into a processor, and the transceiver 402 and the transceiver 502 can be integrated into a transceiver, and integrated in an entity.

Based upon the same inventive idea, an embodiment of the invention further provides a beam training method, and since a device corresponding to this method is a transmitting device in the beam training system according to the embodiment of the invention, and this method addresses the problem under a similar principle to the transmitting device, reference can be made to the implementation of the transmitting device for an implementation of this method, and a repeated description thereof will be omitted here.

Figure 6:
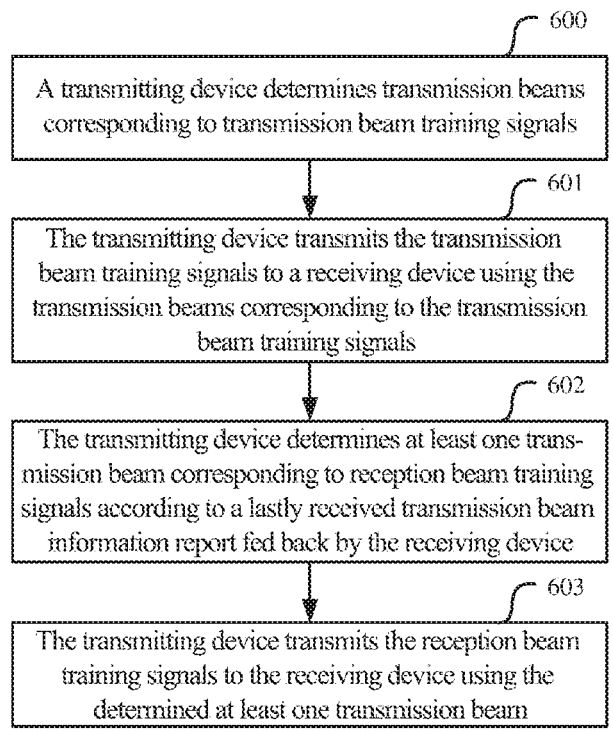
FIG. 6 is a schematic flow chart of a beam training method at the transmitting device side according to an embodiment of the invention.

As illustrated in FIG. 6, a beam training method at the transmitting device side according to an embodiment of the invention includes the following steps.

In the step 600, a transmitting device determines transmission beams corresponding to transmission beam training signals.

In the step 601, the transmitting device transmits the transmission beam training signals to a receiving device using the transmission beams corresponding to the transmission beam training signals.

In the step 602, the transmitting device determines at least one transmission beam corresponding to reception beam training signals.

In the step 603, the transmitting device transmits the reception beam training signals to the receiving device using the at least one transmission beam corresponding to the reception beam training signals.

Optionally the transmitting device determines at least one transmission beam corresponding to the reception beam training signals according to a received transmission beam information report fed back by the receiving device.

Optionally after the transmitting device determines the at least one transmission beam corresponding to the reception beam training signals, the method further includes: the transmitting device transmits data to the receiving device using the at least one transmission beam determined according to the transmission beam information report fed back by the receiving device before a transmission beam information report to be fed back by the receiving device next time is received.

Optionally the transmission beams corresponding to the transmission beam training signals includes: a part or all of transmission beams, where the part of the transmission beams are transmission beams in at least one direction selected from all the transmission beams; and/or transmission beams in adjacent directions of the transmission beam determined by the transmitting device according to the received transmission beam information report fed back by the receiving device, where the transmission beam corresponding to the transmission beam information report is transmission beam selected by the receiving device according to the received transmission beam training signals.

Optionally before the transmitting device transmits the transmission beam training signals to the receiving device using the transmission beams corresponding to the transmission beam training signals, the method further includes: the transmitting device transmits first transmission beam information of the transmission beams corresponding to the transmission beam training signals to the receiving device, so that the receiving device receives the beam training signals corresponding to the transmission beams according to the first transmission beam information.

Optionally the first transmission beam information includes a part or all of: the number of transmission beam training signals, a sequence of each of the transmission beam training signals, a resource occupied by each of the transmission beam training signals, a periodicity of each of the transmission beam training signals, triggering information of each of the transmission beam training signals, start information of each of the reception beam training signals, end information of each of the reception beam training signals, and a transmitting device identification number corresponding to each of the transmission beam training signals.

Optionally before the transmitting device transmits the reception beam training signals to the receiving device using the at least one transmission beam corresponding to the reception beam training signals, the method further includes: the transmitting device transmits second transmission beam information of the at least one transmission beam corresponding to the reception beam training signals to the receiving device, so that the receiving device receives the determined reception beam training signals corresponding to the at least one transmission beam according to the second transmission beam information.

Optionally the second transmission beam information includes a part or all of: the number of reception beam training signals, a sequence of each of the reception beam training signals, a resource occupied by each of the reception beam training signals, a periodicity of each of the reception beam training signals, triggering information of each of the reception beam training signals, start information of each of the reception beam training signals, end information of each of the reception beam training signals, and a transmitting device identification number corresponding to each of the reception beam training signals.

Optionally the transmitting device places the first transmission beam information and the second transmission beam information in different signaling, and transmits the signaling to the receiving device; or the transmitting device places the first transmission beam information and the second transmission beam information in the same signaling, and transmits the signaling to the receiving device.

Optionally transmitting, by the transmitting device, the reception beam training signals to the receiving device using the at least one transmission beam corresponding to the reception beam training signals includes: when the receiving device receives reception beam training signals corresponding to one transmission beam using one reception beam, then the transmitting device transmits the reception beam training signals repeatedly.

Optionally the method further includes: when the transmission beam information report received by the transmitting device includes a transmitting device identification number, then the transmitting device determines the transmitting device, which provides the transmission beam corresponding to the received transmission beam information report, according to the transmitting device identification number; and when the transmission beam information received by the transmitting device does not include any transmitting device identification number, but includes a transmission beam training signal index, then the transmitting device determines the transmitting device, which provides the transmission beam corresponding to the received transmission beam information report, according to according to a correspondence relationship between the transmission beam training signal index in the transmission beam information report, and the transmitting device providing the transmission beam.

Optionally the transmitting device performs periodically or aperiodically the step of transmitting the transmission beam training signals to the receiving device using the transmission beams corresponding to the transmission beam training signals; and/or the transmitting device performs periodically or aperiodically the step of transmitting the reception beam training signals to the receiving device using the at least one transmission beam corresponding to the reception beam training signals.

Based upon the same inventive idea, an embodiment of the invention further provides a beam training method, and since a device corresponding to this method is a receiving device in the beam training system according to the embodiment of the invention, and this method addresses the problem under a similar principle to the receiving device, reference can be made to the implementation of the receiving device for an implementation of this method, and a repeated description thereof will be omitted here.

Figure 7:
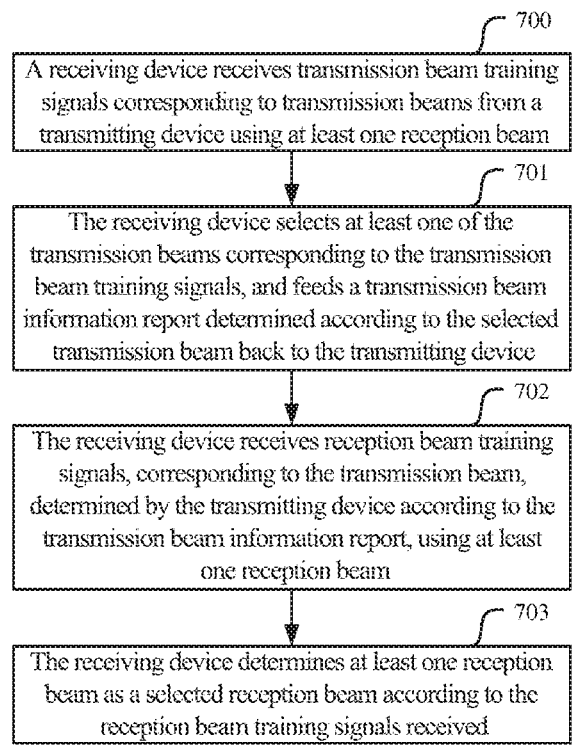
FIG. 7 is a schematic flow chart of a beam training method at the receiving device side according to an embodiment of the invention.

As illustrated in FIG. 7, a beam training method at the receiving device side according to an embodiment of the invention includes the following steps.

In the step 700, a receiving device receives transmission beam training signals corresponding to transmission beams from a transmitting device using at least one reception beam.

In the step 701, the receiving device selects at least one of the transmission beams corresponding to the transmission beam training signals, and feeds a transmission beam information report determined according to the selected first transmission beam back to the transmitting device.

In the step 702, the receiving device receives reception beam training signals transmitted by the transmitting device using at least one reception beam.

In the step 703, the receiving device determines at least one reception beam as a selected reception beam according to the reception beam training signals received.

Optionally after the receiving device determines the at least one reception beam as the selected reception beam, the method further includes: the receiving device receives data from the transmitting device using the selected reception beam before reception beam training signals are received next time.

Optionally the transmission beam information report includes a resource index of the beam training signal determined according to the selected at least one transmission beam.

Optionally before the receiving device receives the transmission beam training signals corresponding to the transmission beams from the transmitting device using the at least one reception beam, the method further includes: the receiving device determines first transmission beam information; and receiving by the receiving device the transmission beam training signals corresponding to the transmission beams from the transmitting device using the at least one reception beam includes: the receiving device receives the transmission beam training signals corresponding to the transmission beams from the transmitting device using the at least one reception beam according to the first transmission beam information.

Optionally determining by the receiving device the first transmission beam information includes: the receiving device receives the determined first transmission beam information from the transmitting device.

Optionally selecting by the receiving device at least one of the transmission beams corresponding to the transmission beam training signals includes: the receiving device selects at least one transmission beam or transmission beam training signal index from the transmission beams corresponding to the beam training signals according to performance index parameters of the received transmission beam training signals; and/or determining by the receiving device at least one of the reception beams as the selected reception beam according to the reception beam training signals received using the different reception beams includes: the receiving device determines at least one of the reception beams as a selected reception beam according to performance index parameters of the reception beam training signals received using the at least one reception beam.

Optionally the performance index parameter includes received power and/or a received signal to noise ratio.

Optionally receiving by the receiving device the transmission beam training signals corresponding to the transmission beams from the transmitting device using the at least one reception beam includes: when the receiving device is not provided with any selected reception beam information, then the receiving device receives the transmission beam training signals corresponding to the transmission beams from the transmitting device using any one or more reception beams; or when the receiving device is provided with selected reception beam information, and receives a transmission beam training signal corresponding to one transmission beam using one reception beam, then the receiving device will receive the transmission beam training signals corresponding to the transmission beams from the transmitting device using reception beams corresponding to the selected reception beam information; or when the receiving device is provided with selected reception beam information, and receives a transmission beam training signal corresponding to one transmission beam using a plurality of reception beams, then the receiving device will receive the transmission beam training signals corresponding to the transmission beams from the transmitting device using a plurality of reception beams corresponding to the selected reception beam information.

Optionally after the receiving device selects at least one of the transmission beams corresponding to the transmission beam training signals, and before the receiving device feeds the transmission beam information report determined according to the selected transmission beam back to the transmitting device, the method further includes: when the first transmission beam information includes a transmitting device identification number, then the receiving device places an identification number of a transmitting device providing the selected transmission beam in the transmission beam information report.

Optionally before the receiving device receives the reception beam training signals transmitted by the transmitting device using the at least one reception beam, the method further includes: the receiving device determines second transmission beam information; and receiving by the receiving device the reception beam training signals transmitted by the transmitting device using the at least one reception beam includes: the receiving device receives the reception beam training signals transmitted by the transmitting device using the at least one reception beam according to the second transmission beam information.

Optionally determining by the receiving device the second transmission beam information includes: the receiving device receives the determined second transmission beam information from the transmitting device.

Optionally receiving by the receiving device the reception beam training signals corresponding to the transmission beams from the transmitting device using the at least one reception beams includes: the receiving device receives beam training signals corresponding to one transmission beam from the transmitting device by receiving a plurality of reception beam training signals corresponding to one transmission beam repeatedly using a plurality of reception beams, where one reception beam training signal corresponding to one transmission beam is received using one reception beam each time; or the receiving device receives reception beam training signals corresponding to one transmission beam from the transmitting device by receiving reception beam training signals corresponding to one transmission beam using a plurality of reception beams.

Based upon the same inventive idea, an embodiment of the invention provides a computer storage medium storing computer executable instructions configured to cause the computer to perform the method performed by the transmitting device above.

Based upon the same inventive idea, an embodiment of the invention provides a computer storage medium storing computer executable instructions configured to cause the computer to perform the method performed by the receiving device above.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

Correspondingly the invention can be further embodied in hardware and/or software (including firmware, resident software, microcodes, etc.). Still furthermore the invention can be embodied in the form of a computer program product on a computer useable or readable storage medium, where the computer program product includes computer useable or readable program codes embodied in the medium to be used by or in connection with an instruction executing system. In the context of the invention, the computer useable or readable medium can be any medium which can include, store, communicate, transmit, or transport program to be used by or in connection with an instruction executing system, apparatus or device.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A beam training method, comprising
    determining, by a transmitting device, transmission beams corresponding to transmission beam training signals;
    transmitting, by the transmitting device, the transmission beam training signals to a receiving device using the transmission beams corresponding to the transmission beam training signals;
    determining, by the transmitting device, at least one transmission beam corresponding to reception beam training signals according to a received transmission beam information report fed back by the receiving device; and
    transmitting, by the transmitting device, the reception beam training signals to the receiving device using the at least one transmission beam corresponding to the reception beam training signals;
    wherein the transmission beams corresponding to the transmission beam training signals comprises:
    transmission beams in adjacent directions of the at least one transmission beam determined by the transmitting device according to the received transmission beam information report fed back by the receiving device;
    wherein the at least one transmission beam corresponding to the transmission beam information report is at least one transmission beam selected from the transmission beams corresponding to the beam training signals by the receiving device according to performance index parameters of the received transmission beam training signals; or
    the at least one transmission beam corresponding to the transmission beam information report corresponds to transmission beam training signal index selected from the transmission beams corresponding to the beam training signals by the receiving device according to performance index parameters of the received transmission beam training signals;
    wherein the performance index parameter comprises received power and/or a received signal to noise ratio by the receiving device.

2. The method according to claim 1, wherein after the transmitting device determines the at least one transmission beam corresponding to the reception beam training signals, the method further comprises:
    transmitting, by the transmitting device, data to the receiving device using the at least one transmission beam determined according to the received transmission beam information report fed back by the receiving device before a next transmission beam information report to be fed back by the receiving device next time is received.

3. The method according to claim 1, wherein before the transmitting device transmits the transmission beam training signals to the receiving device using the transmission beams corresponding to the transmission beam training signals, the method further comprises:
    transmitting, by the transmitting device, first transmission beam information of the transmission beams corresponding to the transmission beam training signals to the receiving device, so that the receiving device receives the beam training signals corresponding to the transmission beams according to the first transmission beam information;
    wherein the first transmission beam information comprises a part or all of:
    the number of transmission beam training signals, a sequence of each of the transmission beam training signals, a resource occupied by each of the transmission beam training signals, a periodicity of each of the transmission beam training signals, triggering information of each of the transmission beam training signals, start information of each of the reception beam training signals, end information of each of the reception beam training signals, and a transmitting device identification number corresponding to each of the transmission beam training signals.

4. The method according to claim 1, wherein before the transmitting device transmits the reception beam training signals to the receiving device using the at least one transmission beam corresponding to the reception beam training signals, the method further comprises:
    transmitting, by the transmitting device, second transmission beam information of the at least one transmission beam corresponding to the reception beam training signals to the receiving device, so that the receiving device receives the determined reception beam training signals corresponding to the transmission beam according to the second transmission beam information;
    wherein the second transmission beam information comprises a part or all of:
    the number of reception beam training signals, a sequence of each of the reception beam training signals, a resource occupied by each of the reception beam training signals, a periodicity of each of the reception beam training signals, triggering information of each of the reception beam training signals, start information of each of the reception beam training signals, end information of each of the reception beam training signals, and a transmitting device identification number corresponding to each of the reception beam training signals.

5. The method according to claim 1, wherein transmitting, by the transmitting device, the reception beam training signals to the receiving device using the at least one transmission beam corresponding to the reception beam training signals comprises:
    when the receiving device receives a reception beam training signal corresponding to one transmission beam using one reception beam, then transmitting, by the transmitting device, the reception beam training signal repeatedly.

6. The method according to claim 1, wherein the method further comprises:
when the transmission beam information report received by the transmitting device comprises a transmitting device identification number, then determining, by the transmitting device, a transmitting device, which provides the transmission beam corresponding to the received transmission beam information report, according to the transmitting device identification number; and
when the received transmission beam information does not comprise any transmitting device identification number, but comprises a transmission beam training signal index, then determining, by the transmitting device, a transmitting device, which provides the transmission beam corresponding to the received transmission beam information report, according to a correspondence relationship between the transmission beam training signal index in the transmission beam information report, and the transmitting device providing the transmission beam.

7. A beam training method, comprising:
receiving, by a receiving device, transmission beam training signals corresponding to transmission beams from a transmitting device using at least one reception beam;
selecting, by the receiving device, at least one of the transmission beams corresponding to the transmission beam training signals, and feeding a transmission beam information report determined according to the selected at least one transmission beam back to the transmitting device;
receiving, by the receiving device, reception beam training signals transmitted by the transmitting device using at least one reception beam; and
determining, by the receiving device, at least one reception beam as a selected reception beam according to the reception beam training signals receive;
wherein selecting, by the receiving device, at least one of the transmission beams corresponding to the transmission beam training signals comprises:
selecting, by the receiving device, at least one transmission beam or transmission beam training signal index from the transmission beams corresponding to the beam training signals according to performance index parameters of the received transmission beam training signals; and/or
determining, by the receiving device, at least one of the reception beams as the selected reception beam according to the reception beam training signals received using the different reception beams comprises:
determining, by the receiving device, at least one reception beam as the selected reception beam according to performance index parameters of the reception beam training signals received;
wherein the performance index parameter comprises received power and/or a received signal to noise ratio.

8. The method according to claim 7, wherein after the receiving device determines the at least one reception beam as the selected reception beam, the method further comprises:
receiving, by the receiving device, data from the transmitting device using the selected reception beam before reception beam training signals are received next time.

9. The method according to claim 7, wherein before the receiving device receives the transmission beam training signals corresponding to the transmission beams from the transmitting device using the at least one reception beam, the method further comprises:
determining, by the receiving device, first transmission beam information; and
receiving, by the receiving device, the transmission beam training signals corresponding to the transmission beams from the transmitting device using the at least one reception beam comprises:
receiving, by the receiving device, the transmission beam training signals corresponding to the transmission beams from the transmitting device using the at least one reception beam according to the first transmission beam information.

10. The method according to claim 9, wherein determining, by the receiving device, the first transmission beam information comprises:
receiving, by the receiving device, the first transmission beam information from the transmitting device.

11. The method according to claim 7, wherein receiving, by the receiving device, the transmission beam training signals corresponding to the transmission beams from the transmitting device using at least one reception beam comprises:
when the receiving device is not provided with any selected reception beam information, then receiving, by the receiving device, the transmission beam training signals corresponding to the transmission beams from the transmitting device using any one or more reception beams; or
when the receiving device is provided with selected reception beam information, and receives a transmission beam training signal corresponding to one transmission beam using one reception beam, then receiving, by the receiving device, the transmission beam training signals corresponding to the transmission beams from the transmitting device using a reception beam corresponding to the selected reception beam information; or
when the receiving device is provided with selected reception beam information, and receives a transmission beam training signal corresponding to one transmission beam using a plurality of reception beams, then receiving, by the receiving device, a transmission beam training signal corresponding to each of the transmission beams from the transmitting device using a plurality of reception beams corresponding to the selected reception beam information.

12. The method according to claim 7, wherein after the receiving device selects at least one of the transmission beams corresponding to the transmission beam training signals, and before the receiving device feeds the transmission beam information report determined according to the selected transmission beam back to the transmitting device, the method further comprises:
when the first transmission beam information comprises a transmitting device identification number, then placing, by the receiving device, an identification number of a transmitting device providing the selected transmission beam in the transmission beam information report.

13. The method according to claim 7, wherein before the receiving device receives the reception beam training signals transmitted by the transmitting device using the at least one reception beam, the method further comprises:

determining, by the receiving device, second transmission beam information; and receiving, by the receiving device, the reception beam training signals transmitted by the transmitting device using the at least one reception beam comprises:

receiving, by the receiving device, the reception beam training signals transmitted by the transmitting device using the at least one reception beam according to the second transmission beam information.

14. The method according to claim 13, wherein determining, by the receiving device, the second transmission beam information comprises:

receiving, by the receiving device, the second transmission beam information from the transmitting device.

15. The method according to claim 7, wherein receiving, by the receiving device, the reception beam training signals corresponding to the at least one transmission beam from the transmitting device using the at least one reception beam comprises:

receiving, by the receiving device, beam training signals corresponding to one transmission beam from the transmitting device by receiving a plurality of reception beam training signals corresponding to one transmission beam repeatedly using a plurality of reception beams, wherein one reception beam training signal corresponding to one transmission beam is received using one reception beam each time; or receiving, by the receiving device, reception beam training signals corresponding to one transmission beam from the transmitting device by receiving reception beam training signals corresponding to one transmission beam using a plurality of reception beams.

16. A transmitting device, comprising: a processor, a memory, and a transceiver, wherein the transceiver is configured to receive and transmit data under the control of the processor, the memory is configured to store preset program, and the processor is configured to read and execute program in the memory:

to determine transmission beams corresponding to transmission beam training signals;

to transmit the transmission beam training signals to a receiving device using the transmission beams determined by the processor through the transceiver;

to transmit reception beam training signals to the receiving device using transmission beams determined by the processor through the transceiver; and to determine the transmission beams corresponding to the reception beam training signals according to a received transmission beam information report fed back by the receiving device;

wherein the transmission beams corresponding to the transmission beam training signals comprises:

transmission beams in adjacent directions of the at least one transmission beam determined by the transmitting device according to the received transmission beam information report fed back by the receiving device;

wherein the at least one transmission beam corresponding to the transmission beam information report is at least one transmission beam selected from the transmission beams corresponding to the beam training signals by the receiving device according to performance index parameters of the received transmission beam training signals; or the at least one transmission beam corresponding to the transmission beam information report corresponds to transmission beam training signal index selected from the transmission beams corresponding to the beam training signals by the receiving device according to performance index parameters of the received transmission beam training signals;

wherein the performance index parameter comprises received power and/or a received signal to noise ratio by the receiving device.

17. A receiving device, comprising: a processor, a memory, and a transceiver, wherein the transceiver is configured to receive and transmit data under the control of the processor, the memory is configured to store preset program, and the processor is configured to read and execute program in the memory:

to receive transmission beam training signals corresponding to transmission beams from a transmitting device using at least one reception beam, and to receive reception beam training signals transmitted by the transmitting device using at least one reception beam, through a transceiver;

to select at least one of the transmission beams corresponding to the transmission beam training signals, and to feed a transmission beam information report determined according to the selected first transmission beam back to the transmitting device through the transceiver; and to determine the at least one reception beam as a selected reception beam according to the reception beam training signals received using the at least one reception beam through the transceiver;

wherein the processor configured to read and execute the program in the memory to selecting at least one of the transmission beams corresponding to the transmission beam training signals is further configured to execute:

selecting at least one transmission beam or transmission beam training signal index from the transmission beams corresponding to the beam training signals according to performance index parameters of the received transmission beam training signals; and/or wherein the processor configured to read and execute the program in the memory to determine at least one of the reception beams as the selected reception beam according to the reception beam training signals received using the different reception beams is further configured to execute:

determining at least one reception beam as the selected reception beam according to performance index parameters of the reception beam training signals received;

wherein the performance index parameter comprises received power and/or a received signal to noise ratio.

* * * * *